US007479771B2

(12) United States Patent
Ryu et al.

(10) Patent No.: US 7,479,771 B2
(45) Date of Patent: Jan. 20, 2009

(54) CURRENT DETECTION CIRCUIT AND SWITCHING POWER SUPPLY

(75) Inventors: Takashi Ryu, Kyoto (JP); Takuya Ishii, Osaka (JP); Mikio Motomori, Hirakata (JP); Hirohisa Tanabe, Nagaokakyo (JP); Tomoya Shigemi, Takatsuki (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/843,896

(22) Filed: Aug. 23, 2007

(65) Prior Publication Data
US 2008/0018387 A1 Jan. 24, 2008

Related U.S. Application Data

(62) Division of application No. 11/195,835, filed on Aug. 2, 2005, now Pat. No. 7,323,850.

(30) Foreign Application Priority Data
Aug. 2, 2004 (JP) ............................. 2004-226094

(51) Int. Cl.
G05F 1/00 (2006.01)
(52) U.S. Cl. ..................... 323/271; 323/282
(58) Field of Classification Search .................. 323/271, 323/282, 284, 289
See application file for complete search history.

(56) References Cited

U.S. PATENT DOCUMENTS 6,198,315 B1 3/2001 Nakano
6,424,131 B1 7/2002 Yamamoto et al.
6,850,401 B2 2/2005 Inoue et al.
7,102,415 B1 * 9/2006 Potanin et al. ............... 327/427
7,268,526 B1 * 9/2007 Smith .......................... 323/285
7,327,149 B2 * 2/2008 Chapuis ....................... 324/522

FOREIGN PATENT DOCUMENTS

| JP | 4-134271 | 5/1992 |
|----|----------|--------|
| JP | 2000-92824 | 3/2000 |
| JP | 2000-166279 | 6/2000 |
| JP | 2001-136737 | 5/2001 |
| JP | 2002-281743 | 9/2002 |
| JP | 2004-056992 | 2/2004 |
| WO | WO-00/79682 | 12/2000 |

* cited by examiner

*Primary Examiner*—Shawn Riley
(74) *Attorney, Agent, or Firm*—Harness, Dickey & Pierce, PLC

(57) ABSTRACT

A current detection circuit of the present invention has a switching device 1; an auxiliary switching device 2; an offset voltage source comprising an offset resistor device 7 and a current source circuit 8; a compensation circuit, comprising a differential amplifier 4 and a compensation transistor 5, for adjusting the output current of the auxiliary switching device 2 so that the potential obtained by subtracting the voltage drop across the offset resistor device 7 from the output potential of the switching device 1 is equal to the output potential of the auxiliary switching device 2, being configured that the detection level of the current flowing in the switching device 1 is shifted by an offset amount.

6 Claims, 6 Drawing Sheets

CURRENT DETECTION CIRCUIT AND SWITCHING POWER SUPPLY

BACKGROUND OF THE INVENTION

The present invention relates to a current detection circuit for detecting the current flowing in a switching device, such as a MIS FET (metal insulator semiconductor field effect transistor), and a switching power supply using the same.

In recent years, switching power supplies have been used in various electronic apparatuses because of their high efficiency and high power conversion characteristics. In particular, in the case that quick transient response characteristics are requested, the current mode control system, which is not affected by the resonance frequency of an inductor and an output capacitor constituting such a switching power supply, is used. The current mode control system detects the current flowing in the inductor and controls the current to carry out output control, and requires a current detection circuit. In the case that a current detection device, such as a resistor, is used in a current detection circuit, a conduction loss occurs and its efficiency is reduced. Hence, a current detection circuit for detecting the current flowing in a switching device, such as a MOS FET (metal-oxide semiconductor field effect transistor), has been proposed as described in International Publication No. WO00/079682, for example.

FIG. 11 is a circuit configuration diagram showing a current detection circuit described as a conventional current detection circuit in International Publication No. WO00/079682. In FIG. 11, an output transistor 101 is formed of an N-channel MOS FET. The drain of this output transistor 101 is connected to a DC power supply 110, and the source thereof is connected to one terminal of a load 103. The other terminal of the load 103 is grounded. An auxiliary transistor 102 is an N-channel MOS FET, the drain thereof is connected to the DC power supply 110, and the source thereof is connected to the source of a compensation transistor 105. The ratio $I101/I102$ of the source current $I101$ of the output transistor 101 to the source current $I102$ of the auxiliary transistor 102 is designed to have a substantially constant value (hereafter, $n=I101/I102$) in the case that the potentials of the drain, gate and source of one of the two switching devices are made equal to those of the other, respectively. This can be realized by making the gate length of the output transistor 101 equal to that of the auxiliary transistor 102 and by setting the ratio of the gate width of the output transistor 101 to that of the auxiliary transistor 102 at n:1 in the case that the current detection circuit is produced so as to be built in a monolithic integrated circuit, for example. The compensation transistor 105 is a P-channel MOS FET, and the drain thereof is connected to one terminal of a current detection resistor 106. The other terminal of the current detection resistor 106 is grounded. A differential amplifier 104 detects the potential difference between the connection point P of the output transistor 101 and the load 103 and the connection point Q of the auxiliary transistor 102 and the compensation transistor 105. The differential amplifier 104 amplifies the detected potential difference and outputs the amplified voltage to the gate of the compensation transistor 105. A drive circuit 111 outputs a common drive signal to the gates of the output transistor 101 and the auxiliary transistor 102.

The operation of the conventional current detection circuit shown in FIG. 11 will be described below.

First, when the potential at the connection point P with respect to the potential at the connection point Q increases in the positive direction by virtue of the differential amplifier 104 and the compensation transistor 105, the potential at the connection point Q rises. Conversely, when the potential at the connection point P increases in the negative direction, the potential at the connection point Q lowers. Hence, the source potential (the potential at the connection point P) of the output transistor 101 becomes substantially equal to the source potential (the potential at the connection point Q) of the auxiliary transistor 102. Furthermore, the drain potential and the gate potential of the output transistor 101 are equal to those of the auxiliary transistor 102, respectively, as clearly understood from the circuit configuration. Hence, the potentials of the drain, gate and source of the output transistor 101 are equal to those of the auxiliary transistor 102, respectively. The ratio $I101/I102$ of the source current $I101$ of the output transistor 101 and the source current $I102$ of the auxiliary transistor 102 is thus maintained at the constant value n. In other words, the source current $I102$ of the auxiliary transistor 102 is $I102=I101/n$, a detection voltage Vs proportionate to the source current $I101$ of the output transistor 101 is generated across the current detection resistor 106. When it is assumed that the resistance value of the current detection resistor 106 is Rs, the detection voltage Vs is $Vs=Rs \cdot I101/n$.

In the case that the conventional current detection circuit configured as described above is applied to the detection of the current flowing in a switching device in a switching power supply, an inductor and a rectifier circuit are connected to a load. In the case of a step-down converter wherein a synchronous rectifier circuit is used in a rectifier circuit, the current of the switching device is passed in the reverse direction in some occasions so that power is regenerated from the output to the input in order to promptly suppress overshoots occurred in the output, for example. However, the conventional current detection circuit configured as described above can detect only the current flowing from the output transistor to the load. In other words, the conventional current detection circuit configured as described above cannot detect the reverse current flowing in the switching device of the switching power supply.

SUMMARY OF THE INVENTION

The present invention is intended to provide a current detection circuit capable of detecting the reverse current flowing in a switching device and to provide a switching power supply, the transient response characteristics of which are improved by using this current detection circuit.

For the purpose of attaining the above-mentioned object, a current detection circuit in accordance with a first aspect of the present invention is a current detection circuit for detecting the current flowing in a switching device. The current detection circuit includes:

an auxiliary switching device being provided in parallel with the switching device and being ON at least when the switching device is ON, an offset voltage source for generating an offset voltage, and a compensation circuit for adjusting the output current of the auxiliary switching device so that the potential obtained by adding the offset voltage to the output potential of the switching device becomes equal to the output potential of the auxiliary switching device. The current detection circuit in accordance with the present invention configured as described above can accurately detect the reverse current flowing in the switching device.

A switching power supply in accordance with another aspect of the present invention includes a switching device, an inductor connected to the switching device, a rectifier circuit for rectifying the output of the inductor, smoothing means for smoothing the current flowing in the rectifier circuit, a current detection circuit for detecting the current of the switching device, and a control circuit, to which the current detection signal from the current detection circuit and the output voltage output from the smoothing means are input, for turning ON/OFF the switching device to control the output voltage.

Further, the current detection circuit includes:

an auxiliary switching device being provided in parallel with the switching device and being ON at least when the switching device is ON.

an offset voltage source for generating an offset voltage, and a compensation circuit for adjusting the output current of the auxiliary switching device so that the potential obtained by adding the offset voltage to the output potential of the switching device becomes equal to the output potential of the auxiliary switching device. The switching power supply in accordance with the present invention configured as described above has excellent transient response characteristics by using the current detection circuit capable of detecting the reverse current flowing in the switching device.

The current detection circuit in accordance with the present invention can surely detect the reverse current flowing in the switching device by using a simple configuration.

In addition, the reverse current of the switching device, flowing from the output to the input so that power is regenerated, can be detected and controlled by applying the current detection circuit in accordance with the present invention to the detection of the current flowing in the switching device of the switching power supply conforming to the current mode control system. Hence, overshoots occurred in the output voltage owing to abrupt reduction in the output current, for example, can be suppressed.

Furthermore, in the switching power supply using the current detection circuit in accordance with the present invention and conforming to the current mode control system, the change width of the setting value of the operation current is limited to the necessary minimum during the ordinary operation, and the limitation in the change width of the setting value of the operation current is relaxed during a transient period, for example, when the output conditions change abruptly. Hence, the switching power supply produces excellent effects of quickening responsiveness and smoothing return to the ordinary operation.

Still further, in the switching power supply using the current detection circuit in accordance with the present invention and conforming to the current mode control system, the offset level of the current detection circuit is made variable. During a transient period, for example, when the output conditions change abruptly, the offset level is set at a large value, whereby the detection level is shifted. Hence, the switching power supply has excellent effects of quickening responsiveness and smoothing return to the ordinary operation.

While the novel features of the invention are set forth particularly in the appended claims, the invention, both as to configuration and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

Preferred embodiments of a current detection circuit and a switching power supply using the same in accordance with the present invention will be described below referring to the accompanying drawings.

First Embodiment

Figure 1:
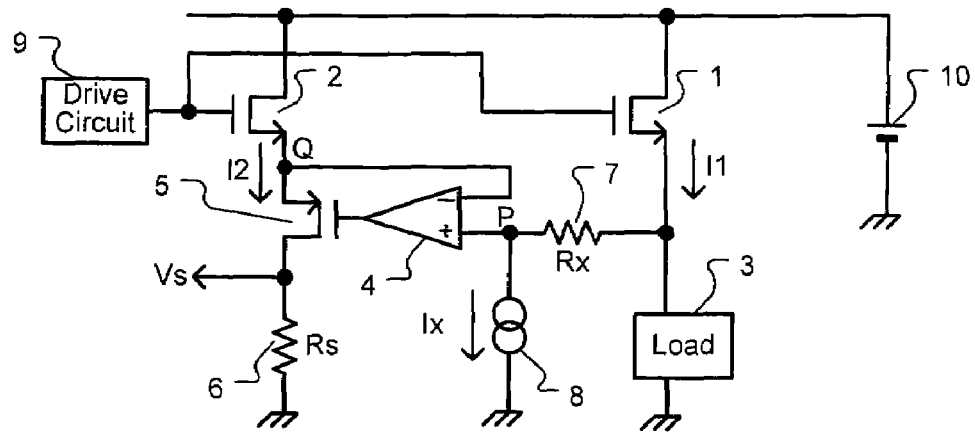
FIG. 1 is a circuit diagram showing the configuration of a current detection circuit in accordance with a first embodiment of the present invention.

FIG. 1 is a circuit diagram showing the configuration of a current detection circuit in accordance with a first embodiment of the present invention. In the current detection circuit in accordance with the first embodiment, an output transistor 1 is a switching device and formed of an N-channel MIS FET (metal insulator semiconductor field effect transistor). An auxiliary transistor 2, connected in parallel with the output transistor 1, is formed of an N-channel MIS FET. In addition, a compensation transistor 5 is formed of a P-channel MIS FET. In FIG. 1, numeral 3 designates a load, numeral 4 designates a differential amplifier, numeral 6 designates a current detection resistor, numeral 7 designates an offset resistor device, numeral 8 designates a current source circuit, numeral 9 designates a drive circuit, and numeral 10 designates a DC power supply.

The drain of the output transistor 1 is connected to the DC power supply 10, the gate thereof is connected to the drive circuit 9, and the source thereof is connected to the load 3. The drain of the auxiliary transistor 2 is connected to the DC power supply 10, the gate thereof is connected to the drive circuit 9, the source thereof is connected to the source of the compensation transistor 5. One terminal of the load 3 is connected to the source of the output transistor 1, and the other terminal of the load 3 is grounded. A current is supplied from the source of the output transistor 1 being ON to the load 3 connected as described above. The ratio I1/I2 of the source current I1 of the output transistor 1 and the source current I2 of the auxiliary transistor 2 is designed to have a substantially constant value (hereafter, n=I1/I2) in the case that the potentials of the drain, gate and source of one of the two transistors are made equal to those of the other, respectively. The ratio of the size of the output transistor 1 to that of the auxiliary transistor 2 is set at n:1 in the case that the current detection circuit is produced so as to be built in a monolithic integrated circuit, for example. Setting the size ratio at n:1 is to make the gate lengths of the two transistors equal and to set the ratio of the gate widths of the two transistors at n:1, for example. The drain of the compensation transistor 5 is connected to one terminal of the current detection resistor 6. The other terminal of the current detection resistor 6 is grounded.

One terminal of the offset resistor device 7 is connected to the connection point of the output transistor 1 and the load 3. To the other terminal of the offset resistor device 7, one terminal of the current source circuit 8 is connected. The other terminal of the current source circuit 8 is grounded. One terminal (the negative input terminal) of the input terminals of the differential amplifier 4 is connected to the connection point Q of the auxiliary transistor 2 and the compensation transistor 5. The other input terminal (the positive input terminal) of the differential amplifier 4 is connected to the connection point P of the offset resistor device 7 and the current source circuit 8. The differential amplifier 4 detects the potential difference between the connection point P and the connection point Q. The differential amplifier 4 amplifies the detected potential difference and outputs the amplified voltage to the gate of the compensation transistor 5.

The drive circuit 9 outputs a common drive signal to the output transistor 1 and the auxiliary transistor 2, thereby turning ON/OFF the output transistor 1 and the auxiliary transistor 2. In the first embodiment, the H level drive signal output from the drive circuit 9 has a high potential capable of sufficiently turning ON the output transistor 1 and the auxiliary transistor 2. Furthermore, the L level drive signal output from the drive circuit 9 has a low potential capable of sufficiently turning OFF the output transistor 1 and the auxiliary transistor 2.

The operation of the current detection circuit in accordance with the first embodiment shown in FIG. 1 will be described below.

In the current detection circuit in accordance with the first embodiment shown in FIG. 1, when the potential at the connection point P with respect to the potential at the connection point Q increases in the positive direction by virtue of the differential amplifier 4 and the compensation transistor 5, the potential at the connection point Q rises. Conversely, when the potential at the connection point P with respect to the potential at the connection point Q increases in the negative direction, the potential at the connection point Q lowers. Hence, the potential at the connection point P of the offset resistor device 7 and the current source circuit 8 becomes substantially equal to the source potential (the potential at the connection point Q) of the auxiliary transistor 2.

On the other hand, the ratio of the ON resistance of the output transistor 1 to the ON resistance of the auxiliary transistor 2, the two transistors being turned ON by the drive circuit 9, is substantially inversely proportionate to the above-mentioned size ratio (n:1). In other words, when it is assumed that the ON resistance of the output transistor 1 is Ron, the ON resistance of the auxiliary transistor 2 is n·Ron. Hence, when it is assumed that the potential of the DC power supply 10 is Vi and that the source current of the output transistor 1 is I1, the source potential of the output transistor 1 is (Vi−I1·Ron). Since the potential at the connection point P is obtained by subtracting the voltage drop across the offset resistor device 7 from the source potential of the output transistor 1, when it is assumed that the resistance value of the offset resistor device 7 is Rx and that the current value of the current source circuit 8 is Ix, the potential at the connection point P is (Vi−I1·Ron−Ix·Rx). When it is assumed that the source current of the auxiliary transistor 2 is I2, the potential at the connection point Q is (Vi−n·Ron·I2). Since the potential at the connection point Q becomes equal to the potential at the connection point P, the source current I2 of the auxiliary transistor 2 is represented by the following expression (1).

$I2=(I1+Ix·Rx/Ron)/n$ (1)

When it is assumed that the resistance value of the current detection resistor 6 is Rs, a detection voltage Vs being related to the source current I1 of the output transistor 1 as represented by the following expression (2) is generated across the current detection resistor 6.

$Vs=Rs·(I1+Ix·Rx/Ron)/n$ (2)

Figure 2:
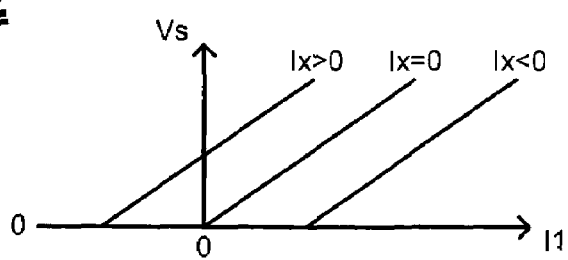
FIG. 2 is a characteristic graph in the current detection circuit in accordance with the first embodiment of the present invention.

FIG. 2 is a characteristic graph of the current detection circuit in accordance with the first embodiment, showing the relationship of the above-mentioned expression (2). When the current value Ix of the current source circuit 8 is zero (Ix=0), the expression (2) is Vs=Rs·I1/n. The detection voltage Vs is proportionate to the source current I1 of the output transistor 1. In this case, the source current I1 can be detected only in the positive direction.

In the case that the current value Ix of the current source circuit 8 is larger than zero (Ix>0), the detection voltage Vs is (Rs·Ix·Rx/Ron)/n even when the source current I1 of the output transistor 1 is zero. Furthermore, even when the source current I1 is negative, detection is possible in the range of the source current I1 reaching the value of (−Ix·Rx/Ron) at which Vs=0.

In the case that the current value Ix of the current source circuit 8 is smaller than zero (Ix<0), that is, in the case that the current of the current source circuit 8 flows in the offset resistor device 7 in the reverse direction, the value of (−Ix·Rx/Ron) at which Vs=0 is positive. In this case, the source current I1 of the output transistor 1 having larger output can be detected.

As described above, in the current detection circuit in accordance with the first embodiment of the present invention, the offset is added to the detection current by providing the offset resistor device 7 and the current source circuit 8. With this configuration, it is possible to detect the source current I1 of the output transistor 1 even when the current flows in the negative direction.

In the current detection circuit in accordance with the first embodiment, the offset resistor device 7 and the current source circuit 8 constitute an offset voltage source. Furthermore, the differential amplifier 4 and the compensation transistor 5 constitute a compensation circuit.

Second Embodiment

Figure 3:
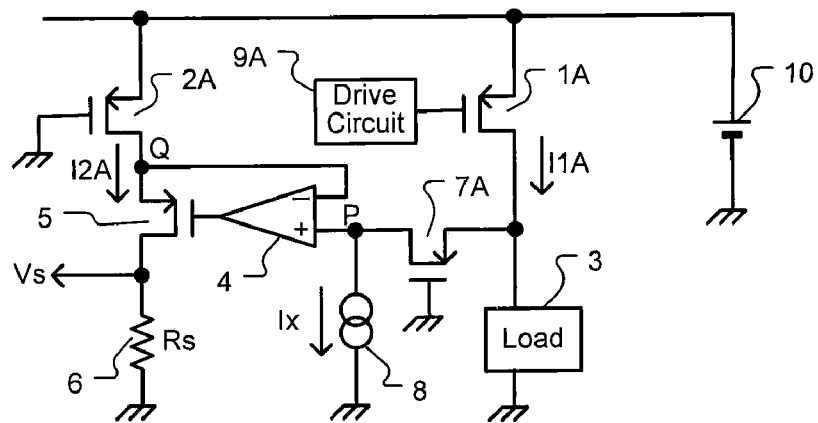
FIG. 3 is a circuit diagram showing the configuration of a current detection circuit in accordance with a second embodiment of the present invention.

A current detection circuit in accordance with a second embodiment of the present invention will be described below using the accompanying drawing, FIG. 3. FIG. 3 is a circuit diagram showing the configuration of the current detection circuit in accordance with the second embodiment.

In FIG. 3, numeral 1A designates an output transistor serving as a switching device and formed of a P-channel MIS FET. Numeral 2A designates an auxiliary transistor formed of a P-channel MIS FET. Numeral 3 designates a load, numeral 4 designates a differential amplifier, numeral 5 designates a compensation transistor formed of a P-channel MIS FET, numeral 6 designates a current detection resistor, numeral 7A designates an offset resistor device formed of a P-channel MIS FET, numeral 8 designates a current source circuit, numeral 9 designates a drive circuit, and numeral 10 designates a DC power supply. The configuration of the current detection circuit in accordance with the second embodiment differs from that of the current detection circuit in accordance with the first embodiment shown in FIG. 1 described above in that the output transistor 1A, the auxiliary transistor 2A and the offset resistor device 7A are each formed of a P-channel MIS FET and that the gate of the auxiliary transistor 2A and the gate of the offset resistor device 7A are grounded. Since the other components are similar to those of the first embodiment shown in FIG. 1, their detailed configurational descriptions are omitted.

In FIG. 3, the source of the output transistor 1A is connected to the DC power supply 10, the gate thereof is connected to the drive circuit 9A, and the drain thereof is connected to the load 3. The source of the auxiliary transistor 2A is connected to the DC power supply 10, the gate thereof is grounded, and the drain thereof is connected to the source of the compensation transistor 5. The source of the offset resistor device 7A is connected to the connection point of the output transistor 1A and the load 3, the drain thereof is connected to the current source circuit 8, and the gate thereof is grounded.

The current detection circuit in accordance with the second embodiment is produced so as to be built in a monolithic integrated circuit, and the ratio of the size of the output transistor 1A, the size of the auxiliary transistor 2A and the size of the offset resistor device 7A is set at n:1:k. Setting the size ratio at n:1:k is to make the gate lengths of the three transistors equal and to set the ratio of the gate widths of the three transistors at n:1:k, for example.

The differential amplifier 4 detects the potential difference between the connection point P of the offset resistor device 7A and the current source circuit 8 and the connection point Q of the auxiliary transistor 2A and the compensation transistor 5, and amplifies the potential difference. The differential amplifier 4 then outputs the amplified voltage to the gate of the compensation transistor 5. The drive circuit 9A outputs a drive signal to the gate of the output transistor 1, thereby turning ON/OFF the output transistor 1A. The L level drive signal output from the drive circuit 9A has a ground potential capable of sufficiently turning ON the output transistor 1A. Furthermore, the H level drive signal output from the drive circuit 9A has a high potential (for example, the power supply voltage Vi) capable of sufficiently turning OFF the output transistor 1A.

The operation of the current detection circuit in accordance with the second embodiment shown in FIG. 3 will be described below.

In the current detection circuit in accordance with the second embodiment, when the potential at the connection point P with respect to the potential at the connection point Q increases in the positive direction by virtue of the differential amplifier 4 and the compensation transistor 5, the potential at the connection point Q rises as in the case of the above-mentioned first embodiment. Conversely, when the potential at the connection point P with respect to the potential at the connection point Q increases in the negative direction, the potential at the connection point Q lowers. Hence, the potential at the connection point P of the offset resistor device 7A and the current source circuit 8 becomes substantially equal to the drain potential (the potential at the connection point Q) of the auxiliary transistor 2A.

The auxiliary transistor 2A is ON at all times since the gate thereof is grounded. The ratio of the ON resistance of the output transistor 1A being turned ON by the drive circuit 9A to the ON resistance of the auxiliary transistor 2A is substantially inversely proportionate to the ratio (n:1:k) of the sizes of the output transistor 1A, the auxiliary transistor 2A and the offset resistor device 7A described above. In other words, when it is assumed that the ON resistance of the output transistor 1A is Ron, the ON resistance of the auxiliary transistor 2A is n·Ron. Furthermore, the offset resistor device 7A is also ON since the gate thereof is grounded, whereby the resistance value thereof is (n/k)·Ron. Hence, when it is assumed that the potential of the DC power supply 10 is Vi and that the drain current of the output transistor 1A is I1A, the drain potential of the output transistor 1A is (Vi−I1A·Ron). Since the potential at the connection point P is obtained by subtracting the voltage drop across the offset resistor device 7A from the drain potential of the output transistor 1A, when it is assumed that the current value of the current source circuit 8 is Ix, the potential at the connection point P is (Vi−I1A·Ron−Ix·(n/k)·Ron). When it is assumed that the drain current of the auxiliary transistor 2A is I2A, the potential at the connection point Q is (Vi−n·Ron·I2A). Since the potential at the connection point Q becomes equal to the potential at the connection point P, the drain current I2A of the auxiliary transistor 2A is represented by the following expression (3).

$$I2A = I1A/n + Ix/k \quad (3)$$

When it is assumed that the resistance value of the current detection resistor 6 is Rs, a detection voltage Vs being related to the drain current I1A of the output transistor 1A as represented by the following expression (4) is generated in the current detection resistor 6.

$$Vs = Rs \cdot (I1A/n + Ix/k) \quad (4)$$

As described above, in the current detection circuit accordance with the second embodiment of the present invention, the detection current is offset by providing the offset resistor device 7A and the current source circuit 8. With this configuration, it is possible to detect the drain current I1A of the output transistor 1A even when the current flows in the negative direction. Furthermore, like the output transistor 1A, the offset resistor device 7A is formed of a P-channel MIS FET so that the ON resistance thereof has a value corresponding to the size ratio in the ON state. Hence, the influence of the temperature characteristics and manufacturing fluctuations of the ON resistance can be eliminated. For this reason, the current detection circuit in accordance with the second embodiment of the present invention can carry out highly accurate current detection.

Third Embodiment

Figure 4:
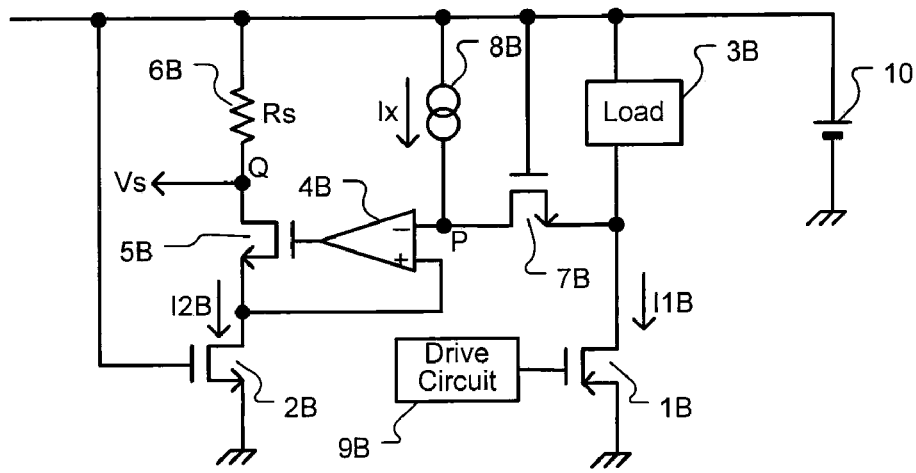
FIG. 4 is a circuit diagram showing the configuration of a current detection circuit in accordance with a third embodiment of the present invention.

A current detection circuit in accordance with a third embodiment of the present invention will be described below using the accompanying drawing, FIG. 4. FIG. 4 is a circuit diagram showing the configuration of the current detection circuit in accordance with the third embodiment of the present invention.

As shown in FIG. 4, in the current detection circuit in accordance with the third embodiment, a load 3B is connected to the power supply potential side. An output transistor 1B serving as a switching device is formed of an N-channel MIS FET, the source of which is grounded. In FIG. 4, an auxiliary transistor 2B, a compensation transistor 5B and an offset resistor device 7B are all formed of an N-channel MIS FET. The gates of the auxiliary transistor 2B and the offset resistor device 7B have the power supply potential Vi, and the source of the auxiliary transistor 2B is grounded. A current source circuit 8B is configured to pass a current to the offset resistor device 7B, and a current detection resistor 6B is connected to the power supply potential side.

As described above, the current detection circuit in accordance with the third embodiment has a configuration wherein the connections to the power supply potential side and the ground potential side in the current detection circuit in accordance with the second embodiment shown in FIG. 3 described above are reversed. Hence, the current detection circuit in accordance with the third embodiment is equivalent to the current detection circuit in accordance with the second embodiment except that the current direction and the voltage polarity are inverted. For this reason, the current detection circuit in accordance with the third embodiment of the present invention configured as described above can also carry out highly accurate current detection.

Fourth Embodiment

Figure 5:
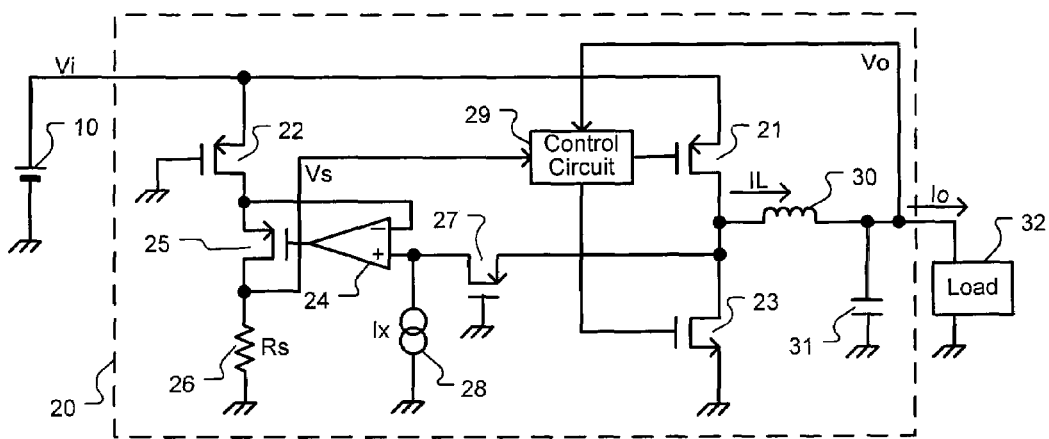
FIG. 5 is a circuit diagram showing the configuration of a switching power supply in accordance with a fourth embodiment of the present invention.
Figure 6:
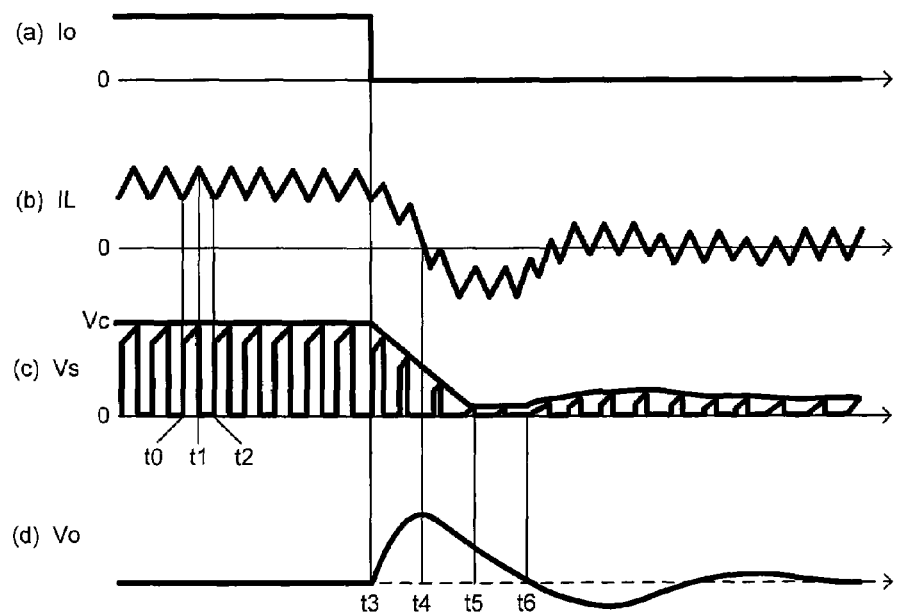
FIG. 6 is a waveform diagram showing operations in the switching power supply in accordance with the fourth embodiment of the present invention.

A switching power supply in accordance with a fourth embodiment of the present invention will be described below using the accompanying drawings, FIGS. 5 and 6. FIG. 5 is a circuit diagram showing the configuration of the switching power supply in accordance with the fourth embodiment. FIG. 6 is a waveform diagram showing the operations of the main sections of the switching power supply in accordance with the fourth embodiment. The switching power supply in accordance with the fourth embodiment is a switching power supply having the configuration of the current detection circuit in accordance with the second embodiment described above In FIG. 5, the switching power supply in accordance with the fourth embodiment is provided with a DC power supply 10 for outputting a power supply voltage Vi and a step-down converter 20, and supplies an output current Io to a load 32. The step-down converter 20 comprises a switching device 21 formed of a P-channel MIS FET, an auxiliary transistor 22 formed of a P-channel MIS FET, a synchronous rectifier transistor 23 formed of an N-channel MIS FET, a differential amplifier 24, a compensation transistor 25 formed of a P-channel MIS FET, a current detection resistor 26 having a resistance value Rs, an offset resistor device 27 formed of a P-channel MIS FET, a current source circuit 28, a control circuit 29 for driving the switching device 21 and the synchronous rectifier transistor 23, an inductor 30, and an output capacitor 31. The synchronous rectifier transistor 23 serves as a rectifier circuit, and the output capacitor 31 serves as a smoothing means.

In the switching power supply in accordance with the fourth embodiment, at least the switching device 21, the auxiliary transistor 22 and the offset resistor device 27 are produced so as to be built in a monolithic integrated circuit, and the ratio of the size of the switching device 21, the size of the auxiliary transistor 22 and the size of the offset resistor device 27 is set at n:1:k. The switching device 21 in the switching power supply in accordance with the fourth embodiment corresponds to the output transistor 1A in the current detection circuit in accordance with the second embodiment described above.

The detection voltage Vs from the current detection resistor 26 is input to the control circuit 29, and the control circuit 29 detects the output voltage Vo supplied from the output capacitor 31 to the load 32. Then, the control circuit 29 sets the upper limit value of the detection voltage Vs so as to stabilize the output voltage Vo and turns ON/OFF the switching device 21 and the synchronous rectifier transistor 23 alternately.

In the waveform diagram of FIG. 6, (a) shows an output current Io supplied from the output capacitor 31 to the load 32, (b) shows a current IL flowing in the inductor 30, (c) shows the detection voltage Vs and the upper limit setting value Vc of the detection voltage Vs, the value being set by the control circuit 29, and (d) shows the output voltage Vo.

The operation of the switching power supply in accordance with the fourth embodiment will be described below referring to FIG. 6, the waveform diagram showing the operations of the main sections.

First, the ordinary operation in the left portion of the waveform diagram of FIG. 6 will be described below.

When the synchronous rectifier transistor 23 is turned OFF and the switching device 21 is turned ON by a drive signal from the control circuit 29 at time t0, a current flows in the inductor 30 from the DC power supply 10 via the switching device 21. This inductance current IL increases in proportion to the input/output voltage difference (Vi−Vo) of the step-down converter 20 with time, the input/output voltage difference being applied to the inductor 30. The auxiliary transistor 22, the differential amplifier 24, the compensation transistor 25, the current detection resistor 26, the offset resistor device 27 and the current source circuit 28 are similar in configuration to those of the current detection circuit in accordance with the second embodiment. The detection voltage Vs represented by the following expression (5) is generated across the current detection resistor 26.

$$Vs = Rs\,(IL/n + Ix/k) \tag{5}$$

The control circuit 29 detects the output voltage Vo, sets the upper limit setting value Vc of the detection voltage Vs so as to stabilize the output voltage Vo, and compares the detection voltage Vs with the upper limit setting value Vc. When the detection voltage Vs reaches the upper limit setting value Vc at time t1, the control circuit 29 turns OFF the switching device 21 and then turns ON the synchronous rectifier transistor 23. The inductance current IL decreases in proportion to the output voltage Vo serving as the voltage applied to the inductor 30. The control circuit 29, having an oscillator (not shown) therein, turns OFF the synchronous rectifier transistor 23 and turns ON the switching device 21 at time t2. The control circuit 29 repeats the above-mentioned operation. In the case that the upper limit setting value Vc of the detection voltage Vs is set at a higher value, the ON state of the switching device 21 becomes longer, the peak value of the inductance current IL becomes larger, and the current for charging the output capacitor 31 increases. Conversely, in the case that the upper limit setting value Vc is set at a lower value, the peak value of the inductance current IL becomes smaller, and the current for charging the output capacitor 31 decreases. In other words, the output power can be controlled by changing the setting of the upper limit setting value Vc. A control method for stabilizing the output voltage Vo by controlling the inductance current IL as described above is referring to as the current mode control system.

Next, the operation in the case that the output current Io has decreased abruptly to zero at time t3 in FIG. 6 will be described below.

After the output current Io decreases abruptly, the power supply from the step-down converter 20 to the load 32 becomes excessive, and the output voltage Vo rises. The control circuit 29 lowers the upper limit setting value Vc of the detection voltage Vs to reset the raised output voltage Vo. As the upper limit setting value Vc lowers, the ON time of the switching device 21 becomes shorter, and the inductance current IL decreases. At time t4, the inductance current IL is zero, and the detection voltage Vs is Rs·Ix/k. The output voltage Vo stops rising at this time. After time t4, the inductance current IL is lower than zero. Then, at time t5, the peak value of the inductance current IL decreases until −(n/k)·Ix corresponding to the value obtained at Vc=0, whereby the output voltage Vo is kept on lowering. When the output voltage Vo comes close to a target value at time t6, the control circuit 29 raises the upper limit setting value Vc, thereby braking the lowering of the output voltage Vo. Then, the output voltage Vo reaches the target value while being subjected to damped oscillation.

As described above, the switching power supply in accordance with the fourth embodiment of the present invention conforms to the current mode control system capable of controlling the current flowing even in the negative direction. Hence, in the case that the output voltage rises owing to abrupt decrease in load, for example, the inductance current is passed reversely to quickly lower the raised output voltage. Therefore, the switching power supply in accordance with the fourth embodiment can produce excellent effects of suppressing the generation of overshoots of the output voltage and promptly returning the output voltage to the target value.

In the switching power supply in accordance with the fourth embodiment, the offset resistor device 27 and the current source circuit 28 constitute an offset voltage source. Furthermore, the differential amplifier 24 and the compensation transistor 25 constitute a compensation circuit.

Fifth Embodiment

Figure 7:
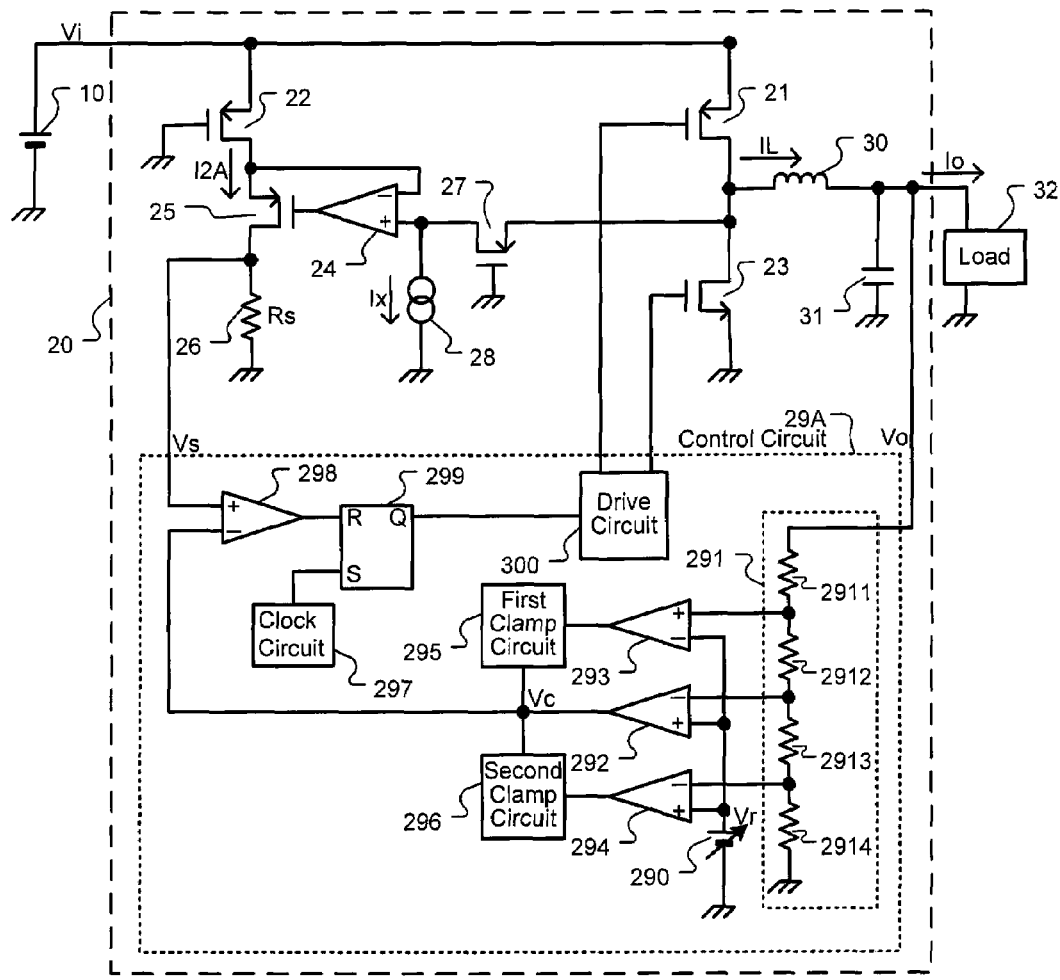
FIG. 7 is a circuit diagram showing the configuration of a switching power supply in accordance with a fifth embodiment of the present invention.
Figure 8:
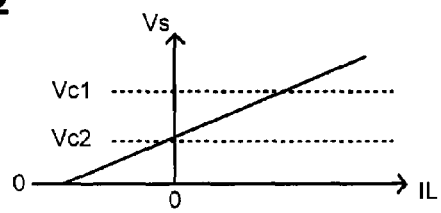
FIG. 8 is a characteristic graph in the current detection circuit of the switching power supply in accordance with the fifth embodiment of the present invention.

A switching power supply in accordance with a fifth embodiment of the present invention will be described below using the accompanying drawings, FIGS. 7 and 8. FIG. 7 is a circuit diagram showing the configuration of the switching power supply in accordance with the fifth embodiment. FIG. 8 is a characteristic graph showing the relationship between the inductance current IL and the detection voltage Vs in the switching power supply in accordance with the fifth embodiment. In FIG. 7, the components having the same functions and configurations as those of the components of the switching power supply in accordance with the fourth embodiment shown in FIG. 5 are designated by the same numerals, and their descriptions are omitted. The switching power supply in accordance with the fifth embodiment differs from the switching power supply in accordance with the fourth embodiment in the configuration of the control circuit. In other words, a function capable of coping with abrupt change in the output voltage is added to the control circuit 29 in accordance with the fourth embodiment. Hence, the control circuit in accordance with the fifth embodiment is referred to as "control circuit 29A" so as to be distinguished from the control circuit 29 in accordance with the fourth embodiment shown in FIG. 5. The internal configuration of the control circuit 29A will be described below specifically.

In FIG. 7, the control circuit 29A comprises a reference voltage source 290, an output voltage detection circuit 291, an error amplifier 292, a first comparator 293, a second comparator 294, a first clamp circuit 295, a second clamp circuit 296, a clock circuit 297, a current comparator 298, an RS latch 299, and a drive circuit 300. The reference voltage source 290 is variable. The reference voltage Vr of the reference voltage source 290 is applied to the positive input terminal of the error amplifier 292, the negative input terminal of the first comparator 293 and the positive input terminal of the second comparator 294. The output voltage detection circuit 291 comprises resistors 2911 to 2914 connected in series and divides the output voltage Vo. The connection point of the resistor 2911 and the resistor 2912 is connected to the positive input terminal of the first comparator 293. The connection point of the resistor 2912 and the resistor 2913 is connected to the negative input terminal of the error amplifier 292. The connection point of the resistor 2913 and the resistor 2914 is connected to the negative input terminal of the second comparator 294.

The error amplifier 292 outputs the upper limit setting value Vc, and the output of the error amplifier 292 is connected to the negative input terminal of the current comparator 298. The output of the first comparator 293 is input to the first clamp circuit 295. When the output of the first comparator 293 is H level, the first clamp circuit 295 clamps the upper limit setting value Vc at a first setting voltage Vc1 or less. When the output of the first comparator 293 is L level, the clamping of the upper limit setting value Vc at the first setting voltage Vc1 or less is released. The output of the second comparator 294 is input to the second clamp circuit 296. When the output of the second comparator 294 is H level, the second clamp circuit 296 clamps the upper limit setting value Vc at a second setting voltage Vc2 or more. When the output of the second comparator 294 is L level, the clamping of the upper limit setting value Vc at the second setting voltage Vc2 or more is released.

The clock circuit 297 outputs a clock signal having a predetermined frequency to the set terminal of the RS latch 299. The detection voltage Vs serving as a current detection signal is input to the positive input terminal of the current comparator 298, and the upper limit setting value Vc is input to the negative input terminal thereof. The current comparator 298 outputs the signal indicating the result of the comparison to the reset terminal of the RS latch 299. The drive circuit 300 turns ON/OFF the switching device 21 and the synchronous rectifier transistor 23 alternately on the basis of the output of the RS latch 299.

Next, the operation of the control circuit 29A of the switching power supply in accordance with the fifth embodiment will be described below.

First, the ordinary operation will be described below. The output voltage Vo is divided by the output voltage detection circuit 291 and compared with the reference voltage Vr by the error amplifier 292. At this time, the reference voltage Vr is set at a first voltage Vr1. The upper limit setting value Vc of the detection voltage output from the error amplifier 292 lowers when the output voltage Vo is higher than a target value, and the upper limit setting value Vc rises when the output voltage Vo is lower than the target value. The RS latch 299 having been set by the clock signal from the clock circuit 297 outputs an H level signal, whereby the drive circuit 300 turns OFF the synchronous rectifier transistor 23 and turns ON the switching device 21. As a result, a current flows from the DC power supply 10 to the inductor 30 via the switching device 21. As this inductance current IL increases, the detection voltage Vs rises.

When the detection voltage Vs becomes higher than the upper limit setting value Vc, the output of the current comparator 298 becomes H level, and the RS latch 299 having been reset outputs an L level signal. On the basis of the L level signal from the RS latch 299, the drive circuit 300 turns OFF the switching device 21 and turns ON the synchronous rectifier transistor 23. This state is maintained until the clock signal from the clock circuit 297 is generated. When the clock signal from the clock circuit 297 is input to the RS latch 299, the RS latch 299 outputs an H level signal, and the above-mentioned operation is repeated. As described above, the switching device 21 and the synchronous rectifier transistor 23 are alternately turned ON/OFF by the drive circuit 300. Hence, the step-down converter 20 supplies the stabilized output voltage Vo to the load 32. During this ordinary operation, the output voltage Vo is stabilized to the target value. Hence, the outputs of the first comparator 293 and the second comparator 294 have H level, and the upper limit setting value Vc is clamped at the second setting voltage Vc2 or more and the first setting voltage Vc1 or less.

Next, the operation in the case that, for the purpose of abruptly raising the output voltage Vo to another target value, the reference voltage Vr of the reference voltage source 290 is set so as to be raised abruptly from the first voltage Vr1 to a second voltage Vr2 will be described below.

Since the reference voltage Vr has been changed from the first voltage Vr1 to the second voltage Vr2, the error amplifier 292 raises the upper limit setting value Vc to raise the output voltage Vo. At the same time, the output of the first comparator 293 has L level since the voltage applied to the negative input terminal thereof has been raised to the second voltage Vr2. As a result, the clamping of the upper limit setting value Vc at the first setting voltage Vc1 or less is released. Hence, the upper limit setting value Vc becomes higher than the first setting voltage Vc1, and the inductance current IL becomes larger than the maximum value obtained during the ordinary operation. Consequently, the charging of the output capacitor 31 proceeds quickly. As the output voltage Vo becomes close to the target value set by the second voltage Vr2 of the reference voltage source 290, the output of the first comparator 293 becomes H level, and the clamping of the upper limit setting value Vc at the first setting voltage Vc1 or less is carried out. For this reason, the upper limit setting value Vc lowers to the first setting voltage Vc1, and the inductance current IL is limited to the maximum value obtained during the ordinary operation. As a result, the charging of the output capacitor 31 is braked. Eventually, the upper limit setting value Vc becomes lower than the first setting voltage Vc1, and the output voltage Vo is stabilized to the target value set by the second voltage Vr2 of the reference voltage source 290.

Next, the operation in the case that, for the purpose of abruptly lowering the output voltage Vo to still another target value, the reference voltage Vr of the reference voltage source 290 is set so as to be lowered abruptly from the second voltage Vr2 to the first voltage Vr1 will be described below.

Since the reference voltage Vr has been changed from the second voltage Vr2 to the first voltage Vr1, the error amplifier 292 lowers the upper limit setting value Vc to lower the output voltage Vo. At the same time, the output of the second comparator 294 has L level since the voltage applied to the positive input terminal thereof has been lowered to the first voltage Vr1. As a result, the clamping of the upper limit setting value Vc at the second setting voltage Vc2 or more is released. Hence, the upper limit setting value Vc becomes lower than the second setting voltage Vc2, and the inductance current IL becomes smaller than the minimum value obtained during the ordinary operation and flows reversely. As a result, the discharging of the output capacitor 31 proceeds quickly. As the output voltage Vo becomes close to the target value set by the first voltage Vr1, the output of the second comparator 294 becomes H level, and the clamping of the upper limit setting value Vc at the second setting voltage Vc2 or more is carried out. For this reason, the upper limit setting value Vc rises to the second setting voltage Vc2, and the inductance current IL is limited to the minimum value obtained during the ordinary operation. As a result, the discharging of the output capacitor 31 is braked. Eventually, the upper limit setting value Vc becomes higher than the second setting voltage Vc2, and the output voltage Vo is stabilized to the target value set by the first voltage Vr1.

FIG. 8 is a characteristic graph showing the relationship between the inductance current IL and the detection voltage Vs of the switching power supply in accordance with the fifth embodiment.

As shown in FIG. 8, in the switching power supply in accordance with the fifth embodiment, the change width of the inductance current IL during the ordinary operation is limited in the range set using the first setting voltage Vc1 and the second setting value Vc2, that is, the necessary minimum. Furthermore, when necessary, the limitation range of the inductance current IL is eliminated, and power supply and regeneration are carried out quickly. Therefore, the switching power supply in accordance with the fifth embodiment is capable of quickly coping with abrupt change in the output voltage and also capable of carrying out smooth return to the ordinary operation.

Sixth Embodiment

Figure 9:
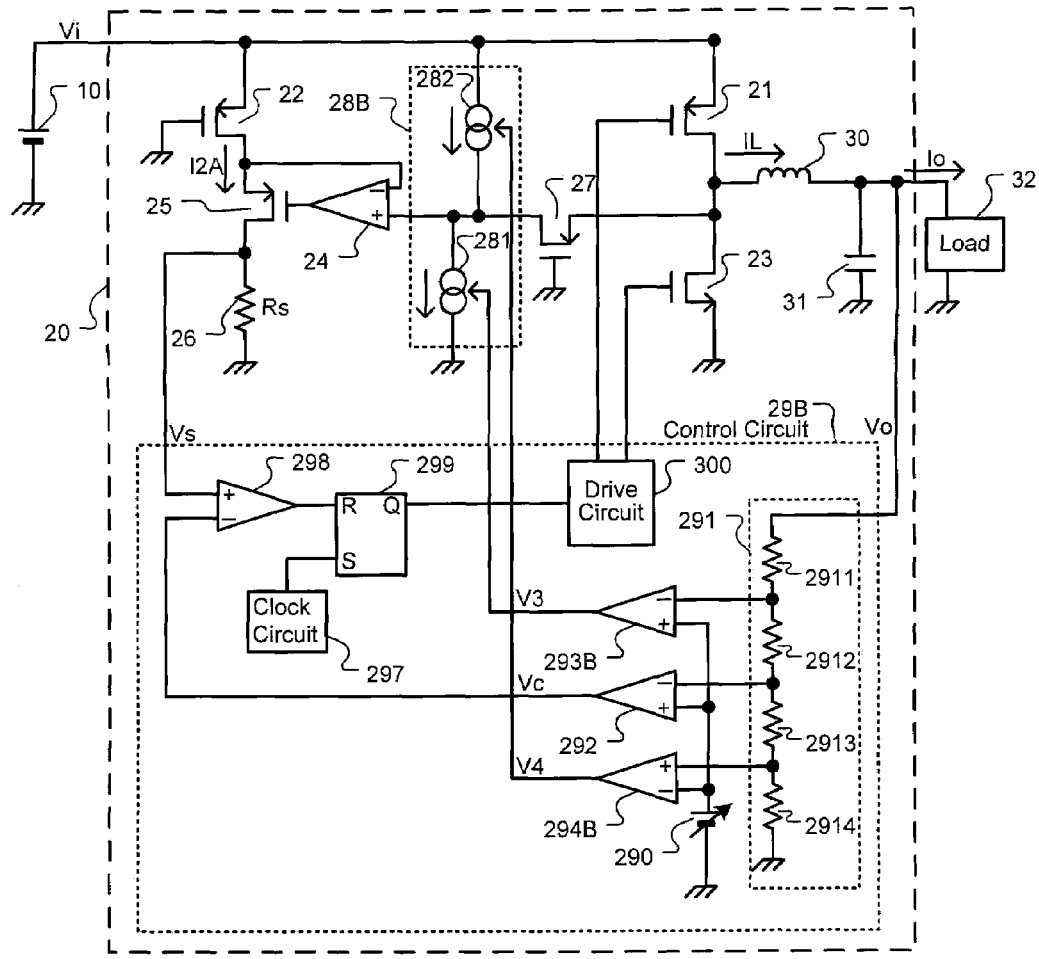
FIG. 9 is a circuit diagram showing the configuration of a switching power supply in accordance with a sixth embodiment of the present invention.
Figure 10:
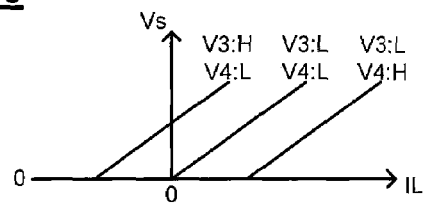
FIG. 10 is a characteristic graph in the current detection circuit of the switching power supply in accordance with the sixth embodiment of the present invention.
Figure 11:
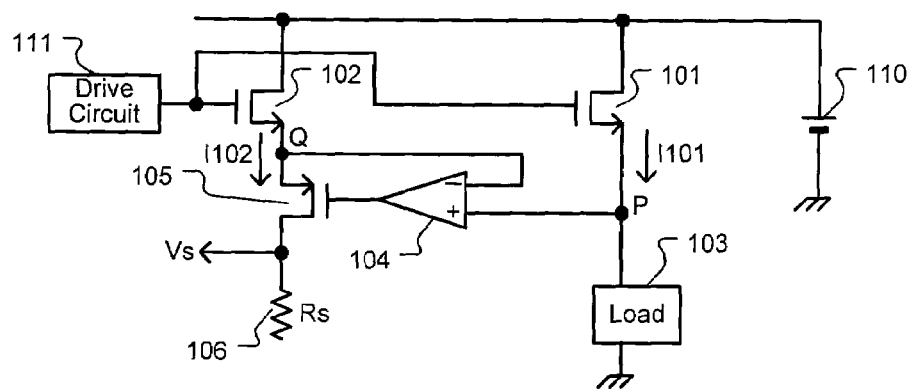
FIG. 11 is the circuit diagram showing the configuration of the conventional current detection circuit.

A switching power supply in accordance with a sixth embodiment of the present invention will be described below using the accompanying drawings, FIGS. 9 and 10. FIG. 9 is a circuit diagram showing the configuration of the switching power supply in accordance with the sixth embodiment. FIG. 10 is a characteristic graph showing the relationship between the inductance current IL and the detection voltage Vs in the switching power supply in accordance with the sixth embodiment.

In FIG. 9, the components having the same functions and configurations as those of the components of the switching power supply in accordance with the fourth embodiment shown in FIG. 5 are designated by the same numerals, and their descriptions are omitted. The switching power supply in accordance with the sixth embodiment differs from the switching power supply in accordance with the fourth embodiment in the configuration of the current source circuit and the control circuit. Hence, the current source circuit and the control circuit in accordance with the sixth embodiment are referred to as "current source circuit 28B" and "control circuit 29B" so as to be distinguished from the current source circuit 28 and the control circuit 29 in accordance with the fourth embodiment shown in FIG. 5. The internal configurations of the current source circuit 28B and the control circuit 29B will be described below specifically.

The configurations of the current source circuit 28B and the control circuit 29B in the switching power supply in accordance with the sixth embodiment shown in FIG. 9 will be described below.

In FIG. 9, the current source circuit 28B comprises a first current source circuit 281 for passing a current from the drain of the offset resistor device 27 to the ground and a second current source circuit 282 for passing a current to the drain of the offset resistor device 27. The first current source circuit 281 and the second current source circuit 282 each have a control terminal. When an H level signal is input to these control terminals, the first current source circuit 281 and the second current source circuit 282 are activated.

In the control circuit 29B in the switching power supply shown in FIG. 9, the components having the same functions and configurations as those of the components of the control circuit 29A in accordance with the fifth embodiment shown in FIG. 7 are designated by the same numerals, and their descriptions are omitted. The control circuit 29B shown in FIG. 9 differs from the control circuit 29A shown in FIG. 7 in that a first comparator 293B and a second comparator 294B are used instead of the first comparator 293 and the second comparator 294 and that the first clamp circuit 295 and the second clamp circuit 296 are not provided.

In the control circuit 29B, the reference voltage Vr of the reference voltage source 290 is applied to the positive input terminal of the first comparator 293B and the negative input terminal of the second comparator 294B. In addition, the connection point of the resistor 2911 and the resistor 2912 is connected to the negative input terminal of the first comparator 293B. The connection point of the resistor 2913 and the resistor 2914 is connected to the positive input terminal of the second comparator 294B. The output V3 of the first comparator 293B is applied to the control terminal of the first current source circuit 281, and the output V4 of the second comparator 294B is applied to the control terminal of the second current source circuit 282

Next, the operation of the control circuit 29B of the switching power supply in accordance with the sixth embodiment will be described below.

First, the ordinary operation will be described below. The output voltage Vo is divided by the output voltage detection circuit 291 and compared with the reference voltage Vr of the reference voltage source 290 by the error amplifier 292. The upper limit setting value Vc of the detection voltage output from the error amplifier 292 lowers when the output voltage Vo is higher than a target value, and the upper limit setting value Vc rises when the output voltage Vo is lower than the target value. The RS latch 299 having been set by the clock signal from the clock circuit 297 outputs an H level signal, whereby the drive circuit 300 turns OFF the synchronous rectifier transistor 23 and turns ON the switching device 21. In this state, a current flows from the DC power supply 10 to the inductor 30 via the switching device 21. As this inductance current IL increases, the detection voltage Vs rises. When the detection voltage Vs becomes higher than the upper limit setting value Vc, the output of the current comparator 298 becomes H level, and the RS latch 299 having been reset outputs an L level signal. On the basis of this L level signal, the drive circuit 300 turns OFF the switching device 21 and turns ON the synchronous rectifier transistor 23. This state is maintained until the clock signal from the clock circuit 297 is generated.

When the clock signal from the clock circuit 297 is input to the RS latch 299, the RS latch 299 outputs an H level signal, and the above-mentioned operation is repeated. As described above, the switching device 21 and the synchronous rectifier transistor 23 are alternately turned ON/OFF by the drive circuit 300. Hence, the step-down converter 20 supplies the stabilized output voltage Vo to the load 32. During this ordinary operation, the output voltage Vo is stabilized to the target value. Hence, the outputs of the first comparator 293B and the second comparator 294B have L level, whereby both the first current source circuit 281 and the second current source circuit 282 of the current source circuit 28B are inactive. Hence, no current flows in the offset resistor device 27, and the voltage across the terminals thereof is zero. In other words, no offset voltage is generated, and the detection voltage Vs generated across the current detection resistor 26 is proportionate to the current flowing in the switching device 21.

Next, the operation in the case that, for the purpose of abruptly raising the output voltage Vo to another target value, the reference voltage Vr is set so as to be raised abruptly from the first voltage Vr1 to the second voltage Vr2 will be described below.

Since the reference voltage Vr has been changed from the first voltage Vr1 to the second voltage Vr2, the error amplifier 292 raises the upper limit setting value Vc to raise the output voltage Vo. At the same time, the output V3 of the first comparator 293B has H level since the voltage applied to the positive input terminal of the first comparator 293B has been raised to the second voltage Vr2. As a result, the first current source circuit 281 of the current source circuit 28B is activated. Hence, a voltage is generated across the offset resistor device 27 by the current of the first current source circuit 281. The detection voltage Vs generated across the current detection resistor 26 has a value lower than the voltage proportionate to the current flowing in the switching device 21 by a predetermined value. In other words, although the upper limit setting value Vc remains unchanged from the original value, since the detection voltage Vs becomes lower, the ON time of the switching device 21 becomes longer so that the detection voltage Vs follows the upper limit setting value Vc. Eventually, the inductance current IL becomes larger than the maximum value obtained during the ordinary operation, and the charging of the output capacitor 31 proceeds quickly. As the output voltage Vo becomes close to the target value set by the second voltage Vr2 of the reference voltage source 290, the output V3 of the first comparator 293B becomes L level. Consequently, the first current source circuit 281 is deactivated and does not pass any current. For this reason, no offset voltage is generated across the offset resistor device 27, and the detection voltage Vs generated across the current detection resistor 26 returns to the voltage proportionate to the current flowing in the switching device 21. In other words, the detection voltage Vs rises. As a result, the inductance current IL is limited to the maximum value obtained during the ordinary operation, and the charging of the output capacitor 31 is in a state of being braked. Eventually, the upper limit setting value Vc lowers, and the output voltage Vo is stabilized to the target value set by the second voltage Vr2 of the reference voltage source 290.

Next, the operation in the case that, for the purpose of abruptly lowering the output voltage Vo to still another target value, the reference voltage Vr is set so as to be lowered abruptly from the second voltage Vr2 to the first voltage Vr1 will be described below.

Since the reference voltage Vr has been changed from the second voltage Vr2 to the first voltage Vr1, the error amplifier 292 lowers the upper limit setting value Vc to lower the output voltage Vo. At the same time, the output V4 of the second comparator 294B has H level since the voltage applied to the negative input terminal of the second comparator 294B has been lowered to the first voltage Vr1. As a result, the second current source circuit 282 of the current source circuit 28B is activated. Hence, a voltage is generated across the offset resistor device 27 by the current of the second current source circuit 282. The detection voltage Vs generated across the current detection resistor 26 has a value higher than the voltage proportionate to the current flowing in the switching device 21 by a predetermined value. In other words, although the upper limit setting value Vc remains unchanged from the original value, since the detection voltage Vs becomes higher, the ON time of the switching device 21 becomes shorter so that the detection voltage Vs follows the upper limit setting value Vc. Eventually, the inductance current IL becomes smaller than the minimum value obtained during the ordinary operation and flows reversely. As a result, the discharging of the output capacitor 31 proceeds quickly. As the output voltage Vo becomes close to the target value set by the first voltage Vr1 of the reference voltage source 290, the output V4 of the second comparator 294B becomes L level. Consequently, the second current source circuit 282 is deactivated and does not pass any current. For this reason, no offset voltage is generated across the offset resistor device 27, the detection voltage Vs generated across the current detection resistor 26 returns to the voltage proportionate to the current flowing in the switching device 21, and the detection voltage Vs lowers. As a result, the inductance current IL is limited to the minimum value obtained during the ordinary operation, and the discharging of the output capacitor 31 is in a state of being braked. Eventually, the upper limit setting value Vc rises, and the output voltage Vo is stabilized to the target value set by the first voltage Vr1 of the reference voltage source 290.

FIG. 10 is a characteristic graph showing the relationship between the inductance current IL and the detection voltage Vs in the switching power supply in accordance with the sixth embodiment. During the ordinary operation, both the output V3 of the first comparator 293B and the output V4 of the second comparator 294B have L level, and both the first current source circuit 281 and the second current source circuit 282 of the current source circuit 28B are inactive. For this reason, no offset voltage is generated, and the detection voltage Vs generated across the current detection resistor 26 is proportionate to the current flowing in the switching device 21. When the output V3 of the first comparator 293B or the output V4 of the second comparator 294B becomes H level to change the output voltage Vo, the offset voltage of the current detection circuit in the switching power supply is generated.

As shown in FIG. 10, in the switching power supply in accordance with the sixth embodiment, the relationship between the inductance current IL and he detection voltage Vs is shifted back and forth from the zero value of the inductance current IL, whereby power supply and regeneration can be carrying out quickly. As a result, the switching power supply in accordance with the sixth embodiment is capable of quickly coping with abrupt change in the output voltage and also capable of carrying out smooth return to the ordinary operation.

Although a step-down converter serving as a switching power supply has been described in the fourth embodiment to the sixth embodiment described above, the current detection circuit in accordance with the present invention is applicable not only to the step-down converter but also to almost all switching power supplies. For example, a current detection circuit including a switching device connected to the power supply potential side as in the first embodiment and the second embodiment can detect the currents of high-side switches included in step-down converters, inverse converters and bridge converters. Furthermore, a current detection circuit including a switching device connected to the ground potential side as in the third embodiment can detect the currents of low-side switches included in step-up converters, single-switch isolated converters and bridge converters.

As described above, the current detection circuit in accordance with the present invention, regardless of whether the circuit is applied to any type of converters, produces excellent effects in the switching power supplies described in the fourth embodiment to the sixth embodiments Although an example wherein a switching device is formed of a MIS FET is described in each embodiment described above, if a J-FET is used as a switching device, a similar effect is produced.

The current detection circuit in accordance with the present invention can detect the current flowing in the negative direction in a transistor, such as a MIS FET. Hence, a switching power supply using this current detection circuit is useful as a power supply capable of stabilizing the output voltage thereof in quick response to abrupt change in output conditions.

Although the invention has been described in its preferred form with a certain degree of particularity, it is understood that the present disclosure of the preferred form has been changed in the details of construction and the combination and arrangement of parts may be resorted to without departing from the spirit and the scope of the invention as claimed.

What is claimed is:

1. A current detection circuit for detecting the current flowing in a switching device, comprising:
   an auxiliary switching device being provided in parallel with said switching device and being ON at least when said switching device is ON,
   an offset voltage source for generating an offset voltage, and
   a compensation circuit for adjusting the output current of said auxiliary switching device so that the potential obtained by adding said offset voltage to the output potential of said switching device becomes equal to the output potential of said auxiliary switching device, wherein
   said offset voltage source comprises an offset resistor device, and a current source circuit for passing a current in said offset resistor device, and
   said offset resistor device is an FET having the same channel type as that of said switching device.

2. The current detection circuit in accordance with claim 1, wherein said switching device and said auxiliary switching device are FETs having the same channel type.

3. The current detection circuit in accordance with claim 1, wherein said compensation circuit comprises:
   a differential amplifier to which the potential obtained by adding said offset voltage to the output potential of said switching device and the output potential of said auxiliary switching device are input, and
   a variable impedance device, connected to the output terminal of said auxiliary switching device, the impedance of which changes depending on the output of said differential amplifier.

4. A switching power supply comprising a switching device, an inductor connected to said switching device, a rectifier circuit for rectifying the output of said inductor, smoothing means for smoothing the current flowing in said rectifier circuit, a current detection circuit for detecting the current of said switching device, and a control circuit, to which the current detection signal from said current detection circuit and the output voltage output from said smoothing means are input, for turning ON/OFF said switching device to control said output voltage, wherein
   said current detection circuit comprises:
   an auxiliary switching device being provided in parallel with said switching device and being ON at least when said switching device is ON,
   an offset voltage source for generating an offset voltage, and a compensation circuit for adjusting the output current of said auxiliary switching device so that the potential obtained by adding said offset voltage to the output potential of said switching device becomes equal to the output potential of said auxiliary switching device, wherein
   said offset voltage source comprises an offset resistor device, and a current source circuit for passing a current in said offset resistor device, and
   said offset resistor device is an FET having the same channel type as that of said switching device.

5. The switching power supply in accordance with claim 4, wherein said control circuit generates a control signal for controlling the output voltage and turns ON/OFF said switching device so that the current detection signal from said current detection circuit follows said control signal.

6. The switching power supply in accordance with claim 5, wherein said rectifier circuit has a rectifier switching device, and said control circuit turns ON/OFF said switching device and said rectifier switching device alternately.

* * * * *